United States Patent
Hekstra et al.

(10) Patent No.: US 7,317,445 B2
(45) Date of Patent: Jan. 8, 2008

(54) MOTION BLUR DECREASE IN VARYING DUTY CYCLE

(75) Inventors: Gerben Johan Hekstra, Eindhoven (NL); Leo Jan Velthoven, Eindhoven (NL); Michiel Adriaanszoon Klompenhouwer, Eindhoven (NL)

(73) Assignee: Koninklijke Philips Electronics N. V., Eindhoven (NL)

( * ) Notice: Subject to any disclaimer, the term of this patent is extended or adjusted under 35 U.S.C. 154(b) by 365 days.

(21) Appl. No.: 10/515,691

(22) PCT Filed: May 21, 2003

(86) PCT No.: PCT/IB03/02165

§ 371 (c)(1),
(2), (4) Date: Nov. 24, 2004

(87) PCT Pub. No.: WO03/101086

PCT Pub. Date: Dec. 4, 2003

(65) Prior Publication Data

US 2005/0168492 A1    Aug. 4, 2005

(30) Foreign Application Priority Data

May 28, 2002 (EP) ................... 02077094

(51) Int. Cl.
*G09G 3/36* (2006.01)
*H04N 5/00* (2006.01)

(52) U.S. Cl. ...................... 345/102; 348/607
(58) Field of Classification Search .......... 345/97, 345/99, 102; 348/607–608
See application file for complete search history.

(56) References Cited

U.S. PATENT DOCUMENTS

| 5,844,540 | A | * | 12/1998 | Terasaki | 345/102 |
| 6,750,837 | B1 | * | 6/2004 | Kondoh | 345/97 |
| 7,145,607 | B1 | * | 12/2006 | Hui | 348/607 |
| 2002/0003522 | A1 | | 1/2002 | Baba et al. | |

FOREIGN PATENT DOCUMENTS

EP    1120679 A1    8/2001

* cited by examiner

*Primary Examiner*—Bipin Shalwala
*Assistant Examiner*—William L Boddie

(57) ABSTRACT

In a method, a display device and a computer program product that reduces motion blur, flicker and loss of brightness of images shown in non-stroboscopic display devices, such as Liquid Crystal, Plasma Panel, Thin Film Transistor, Liquid Crystal on Silicon, color Sequential, Organic Light Emitting Diode or Polymer Light Emitting Diodes displays, in which each image of an input video signal is displayed during a display time $t_i$, which is less than or equal to a picture period T, the motion and the characteristics of motion are measured and the display time $t_i$ is continuously adjusted between 0 and T depending on this measured motion and the characteristics of motion. To further reduce flicker and loss of brightness encountered when reducing the display time, anti-motion blur filtering of the input video signal is performed, where the display time and the amount and sort of filtering is jointly controlled based on the measured motion and characteristics of motion.

10 Claims, 4 Drawing Sheets

MOTION BLUR DECREASE IN VARYING DUTY CYCLE

BACKGROUND OF THE INVENTION

1. Field of the Invention

The invention relates to a method for reducing motion blur, flicker and loss of brightness of images shown in non-stroboscopic display devices, in which each image of an input video signal is displayed during a display time $t_i$, which is less than or equal to a picture period T. The invention further relates to a non-stroboscopic display device.

2. Description of the Related Art

Non-stroboscopic non-emissive displays, such as Liquid Crystal Displays (LCD), Plasma Panel Displays (PDP), Thin Film Transistor (TFT) displays, Liquid Crystal on Silicon (LCOS) displays or Color Sequential Displays, consist of a display panel having a row and column array of picture elements (pixels) for modulating light, means for illuminating the display panel from the front or back side, and drive means for driving the pixels in accordance with an applied input video signal. Quite similar, non-stroboscopic emissive displays, such as Organic Light Emitting Diodes (O-LED) displays or Polymer Light Emitting Diodes (Poly-LED) displays, consist of a display panel having a row and column array of pixels (LEDs) and drive means for driving the pixel (LEDs) in accordance with an applied input video signal. However, the pixels (LEDs) emit and modulate light by themselves without requiring illumination from the front or back side.

In state-of-the-art Cathode Ray Tubes (CRTs), each pixel of a displayed image is generated as a pulse, which is very short compared to the picture period T. Different to these state-of-the-art CRTs, in new flat, high quality, low cost non-stroboscopic display devices, each pixel is displayed during most of the picture period. Of course, this non-stroboscopic behavior also holds for types of CRTs whose pixels, e.g., slow phosphor atoms, are active for a time not negligible to the picture period. In the sequel of this description, we thus will only differentiate between stroboscopic and non-stroboscopic displays, and in case of a non-stroboscopic display, we will use the term "pixel" for both the elements of a light modulation/generation array and the activated (slow) atoms of a CRT-type display.

In the case where any part of the image displayed on a non-stroboscopic display contains motion, the viewer will track this motion. As each pixel is displayed substantially the whole picture period, the intensity of pixels showing the motion is integrated along the motion trajectory as follows:

$$F_{out}(\vec{x}, n) = \frac{1}{t_i} \int_0^{t_i} F\left(\vec{x} + \frac{t}{T}\vec{D}, n\right) dt \quad (1)$$

with $t_i$ as display time of each image, F as input video signal, $F_{OUT}$ as output video signal, and T as picture period. The motion vector $\vec{D}=\vec{v}T$ is the product of the object velocity $\vec{v}$ and the picture period T. In case $t_i$ is constant, the integration is the same as a convolution of $F(\vec{x},n)$ and a sample-and-hold function $h(\alpha)$:

$$F_{out}(\vec{x}, n) = \frac{T}{t_i} \int_0^{t_i/T} F(\vec{x} + \alpha\vec{D}, n) d\alpha \quad (2)$$

$$= \int_{-\infty}^{\infty} F(\vec{x} + \alpha\vec{D}, n) \cdot h(\alpha) d\alpha$$

where $$h(\alpha) = \begin{cases} \frac{T}{t_i}, & 0 \leq \alpha \leq \frac{t_i}{T} \\ 0, & \text{otherwise} \end{cases} \quad (3)$$

is a 1D block function, oriented along the motion vector $\vec{D}$. It is therefore actually a 2D function $h(\vec{x})$, which has zero value outside the line segment $\vec{x}=k\vec{D}$, $0 \leq k \leq t_i/T$, while the 2D integral area is normalized to 1. The 2D spatial Fourier transform is:

$$F_{out}(\vec{f}, n) = \int_{-\infty}^{\infty}\int_{-\infty}^{\infty} F_{out}(\vec{x}, n) e^{(-j2\pi\vec{x}\vec{f})} d\vec{x} \quad (4)$$
$$= F(\vec{f}, n) \cdot H(\vec{f})$$

with $F(\vec{f},n)$ the 2D spatial Fourier transform of the original signal $F(\vec{x},n)$, and $H(\vec{f})$ the 2D spatial Fourier transform of $H(\vec{x})$:

$$H(\vec{f}) = \frac{\sin\left(\pi \vec{D}\frac{t_i}{T}\vec{f}\right)}{\pi \vec{D}\frac{t_i}{T}\vec{f}}. \quad (5)$$

Apparently, the effect of the motion tracking/temporal sample-and-hold characteristic is a low-pass filtering in the direction of the motion with a sinc-frequency response, with a cut-off-frequency being inversely proportional to the quantity $$\frac{t_i}{T}\vec{D},$$

where $$\frac{t_i}{T}$$

is denoted as the duty cycle of the display. The non-stroboscopic light generation, combined with the eye tracking of the viewer trying to follow moving objects from one image to the next, thus leads to the perception of motion-dependent blur in the images. When the motion $\vec{D}$ in the image increases, the cut-off-frequency of the spatial low-pass filter and thus the degree of perceived motion blur can be kept constant by reducing the display time $t_i$ (or the duty cycle $$\frac{t_i}{T}$$

with the drawback of loss of brightness and increased flicker.

U.S. Patent Application Publication No. U.S. 2002/0003522 A1, corresponding to U.S. Pat. No. 7,106,350 B2, discloses that motion blur in non-stroboscopic display devices can be mitigated by reducing the display time $t_i$ of each image. The display time in light modulating displays can be efficiently controlled by switching the lamps that illuminate the display panel, or by appropriate driving of a shutter element that is able to block the light flux through the display panel. In emissive O-LED or Poly-LED displays, the display time is even simpler controlled by switching the LEDs themselves. The reduction of the display time increases the cut-off-frequency of the low-pass filter in the spatial frequency domain, so that less image information in the spatial frequency domain is suppressed and less motion blur occurs. U.S. 2002/0003522 A1 proposes to decide whether an image is a motion image or a still image. The display time $t_i$ is then assigned one of two predefined values according to the threshold-based outcome of the binary decision, e.g., $t_i=T/2$ for the motion image and $t_i=T$ for the still image.

The general disadvantage encountered when reducing the display time to reduce motion blur is the accompanying reduction of image brightness. Furthermore, the presence of display ($t_i$) and non-display (T-$t_i$) periods within a picture period of duration T are perceived as flicker by the viewer. Reduced motion blur is thus traded against increased flicker and loss of brightness.

The adjustment of the display time based on a binary decision whether an image of a motion image or a still image as proposed in U.S. 2002/0003522 A1 leads to the adjustment of the same display time for images with a large amount of motion and for images with a medium amount of motion that is only large enough so that the image is considered as motion image, depending on the threshold defined for the decision between motion images and still images. Thus, especially for said image with medium amount of motion near the decision threshold, by far too much flicker and loss of brightness is accepted than actually necessary. In a similar fashion, images with medium amount of motion near the decision threshold that are considered as still images undergo by far too much blur than actually necessary.

SUMMARY OF THE INVENTION

It is thus the object of this invention to provide an improved motion portrayal with reduced motion blur, flicker and loss of brightness for non-stroboscopic display devices.

To solve the object of the invention, it is proposed that the motion and the characteristics of motion in the images of the input video signal are measured and that the display time $t_i$ is continuously adjusted between 0 and T depending on this measured motion and the characteristics of motion.

In this way, the display time is only reduced to an extent that is unavoidable to efficiently suppress motion blur, and, correspondingly, the side effects of flicker and loss of brightness are significantly reduced.

The amount and characteristics of motion are derived from the motion vectors $\overline{D}$, e.g., the length $|\overline{D}|$ and the direction arg ($\overline{D}$) of the motion vector, and may be determined for each pixel or for groups of pixels of the display.

In the case of a flashing back-light, all back-lights are then jointly switched according to one common adjusted display time.

In the case of a scanning back-light, different display times for each back-light associated with one or several pixels, as, e.g., one or several segmented rows or columns of pixels, may be adjusted according to the amount and characteristics of motion of the corresponding pixels.

Similarly, in the case of emissive displays, such as O-LED or Poly-LED displays, all pixels (LEDs) may either be jointly switched according to one common adjusted display time, or different display times for one or several pixels, as, e.g., one or several segmented rows or columns of pixels, may be adjusted according to the amount and characteristics of motion of the corresponding pixels.

According to a preferred embodiment of the invention, the loss of brightness resulting from the reduced display time can be mitigated by controlling the instantaneous light output of the front-light or back-light of the display in the case of non-emissive displays, or the instantaneous light output of the emissive pixels (LEDs) in the case of emissive displays, depending on the display time. In the case of the emissive displays, the instantaneous light output is defined as the average instantaneous light output taken over all emissive pixels of the display.

This control, as a further preferred embodiment, can aim at a constant overall light output of the front-lights, back-lights or emissive pixels by demanding that the product of instantaneous light output and display time is constant. Loss of brightness then can be avoided when reducing the display time.

A further embodiment of the invention uses information on the state of the drivers for front-light or back-light generation, or on the state of the drivers of the emissive pixels, to improve the motion-dependent control of the display time. Driver signaling that the maximum or minimum instantaneous light output of the front-lights or back lights or of the emissive pixels has been reached, represents a valuable information for the control of the display time.

The proposed method for reducing motion blur, flicker and loss of brightness by motion-dependent adjustment of the display time is further improved by combining it with anti-motion blur filtering of the input video signal. The display time and the sort and amount of filtering are jointly controlled based on the measured motion and the characteristics of motion. Due to the additional anti-motion blur filtering, suppression of motion blur can be achieved with larger display times, resulting in less flicker and reduced loss of brightness.

Anti-motion blur filtering can, for instance, be implemented by a high spatial frequency boosting filter that pre-compensates for the motion-dependent low-pass filtering in the spatial frequency domain. According to equation 5, the amount of motion determines the cut-off-frequency of said spatial frequency domain low-pass filter. Depending on the measured amount of motion in the video signal, an adapted spatial frequency domain filter can be applied to the input video signal, where, in general, with increasing amount of motion, even lower spatial frequencies of the input video signal will be enhanced. Information on the direction of the motion vector may be exploited to control the direction of the frequency characteristic of the anti-motion blur filter.

To reduce undesired noise modulation in areas of little or no detail where motion vectors can be unreliable, local image characteristics of the input video signal that determine high spatial frequencies can be considered in the filtering process, e.g., image detail, image contrast, image texture, mean signal value or peak-to-peak value. Furthermore, filtering of flat image areas or areas with high contrast detail can be avoided by appropriate masking and clipping of the filtered input video signal or of intermediate signals occurring in the process of anti-motion blur filtering.

Another preferred embodiment of the invention uses information on the state of the drivers for front-light or back-light generation, or on the state of the pixel drivers, to improve the motion-dependent joint control of display time and sort and amount of anti-motion blur filtering, for example, information that the maximum or minimum instantaneous light output of the front-light, back-light or of the emissive pixels has been reached.

Yet a further preferred embodiment of the invention incorporates high spatial frequency properties of the input video signal into the motion-dependent joint control of display time and sort and amount of anti-motion blur filtering. These properties basically contain information on how reliable anti-motion blur filtering can be performed.

In a further preferred embodiment, black level, peak white, noise level, edge information, image detail, image contrast, image texture, mean signal value or peak-to-peak value are incorporated as high spatial frequency properties into the motion-dependent joint control of display time and sort and amount of anti-motion blur filtering.

Another preferred embodiment of the invention uses information obtained during the process of anti-motion blur filtering to improve the motion-dependent joint control of the display time and the sort and amount of filtering. For instance, the frequency of the event that the filtered input video signal exceeds the dynamic range of the display and the dynamic range of the filtered video signal itself represent information which can only be obtained during the process of filtering.

A further preferred embodiment of the invention is characterized in that with increasing measured amount of motion, the amount of anti-motion blur filtering is steadily increased until a maximum amount of anti-motion blur filtering is reached and that with said increasing measured amount of motion, the display time $t_i$ is first kept constant and then steadily reduced below the picture period T until a minimum display time is reached. With increasing measured amount of motion, the amount of anti-motion blur filtering is increased until it causes visible artefacts. To reduce flicker and loss of brightness, the reduction of the display time is delayed and starts only for higher measured amounts of motion. The minimum display time may be determined by the maximum light output capability of the front-light or back-light or the emissive pixels.

A further preferred embodiment is characterized in that the amount of anti-motion blur filtering is increased with increasing measured amount of motion without reducing the display time $t_i$ below the picture period T as long as the measured amount of motion is below a first threshold, that the amount of anti-motion blur filtering is kept constant and the display time is reduced with increasing measured amount of motion as long as the measured amount of motion is above the first threshold and below a second threshold, and that the display time is not further decreased and the amount of anti-motion blur filtering is kept constant if the measured amount of motion is above the second threshold.

With increasing amount of measured motion, the display time $t_i$ is not reduced below the picture period T to avoid flicker and loss of brightness, and blur is suppressed by increasing the amount of anti-motion blur filtering, e.g., by boosting lower spatial frequencies when anti-motion blur filtering is implemented by a high spatial frequency boosting filter. With further increasing motion exceeding a first threshold, anti-motion blur filtering is no longer capable of suppressing blur alone, so that the display time is then reduced with increasing amount of motion, whereas the amount of anti-motion blur filtering is kept constant. With further increasing amount of measured motion exceeding a second threshold, the display time cannot be further reduced and is kept constant, as well as the amount of anti-motion blur filtering.

A further preferred embodiment of the invention describes the definition of the first threshold as being marked by visible artefacts resulting from anti-motion blur filtering.

A further preferred embodiment of the invention relates the second threshold to the maximum instantaneous light output capability of the front- or back-lights or the emissive pixels. When the display time is reduced further inversely proportional to the amount of measured motion and the measured motion exceeds the second threshold, a drop of brightness occurs. The lights or emissive pixels then have reached their output maximum and no longer can compensate for the loss of brightness resulting from a reduced display time. To determine the maximum instantaneous light output capability of the pixels in case of emissive displays, the average instantaneous light output is taken over all pixels of the display.

The invention further comprises a non-stroboscopic display device with means to display each image of an input video signal during a display time $t_i$, which is less than or equal to a picture period T, characterized in that means to measure the motion and the characteristics of motion in the images of the input video signal are provided and that means to continuously adjust the display time $t_i$ between 0 and T according to the measured motion and the characteristics of motion are provided.

The invention also comprises a non-stroboscopic display device with means to display each image of an input video signal during a display time $t_i$, which is less than or equal to a picture period T, characterized in that means to measure the motion and the characteristics of motion in the images of the input video signal are provided, that means to filter the input video signal to pre-compensate for the viewer's integration of pixel intensities along the motion trajectory of moving objects in the input video signal, which can be interpreted as motion-dependent low-pass filtering in the spatial frequency domain, are provided and that means to jointly control the sort and amount of this anti-motion blur filtering with the display time $t_i$ according to the measured motion and the characteristics of motion are provided.

The invention further comprises a computer program product directly loadable into the internal memory of a digital computer, comprising software code portions for performing the above-mentioned method steps when said product is run on a computer.

BRIEF DESCRIPTION OF THE DRAWINGS

These and other aspects of the invention will be apparent from and elucidated with reference to the embodiments described hereinafter. In the figures.

DESCRIPTION OF THE PREFERRED EMBODIMENTS

Figure 1:
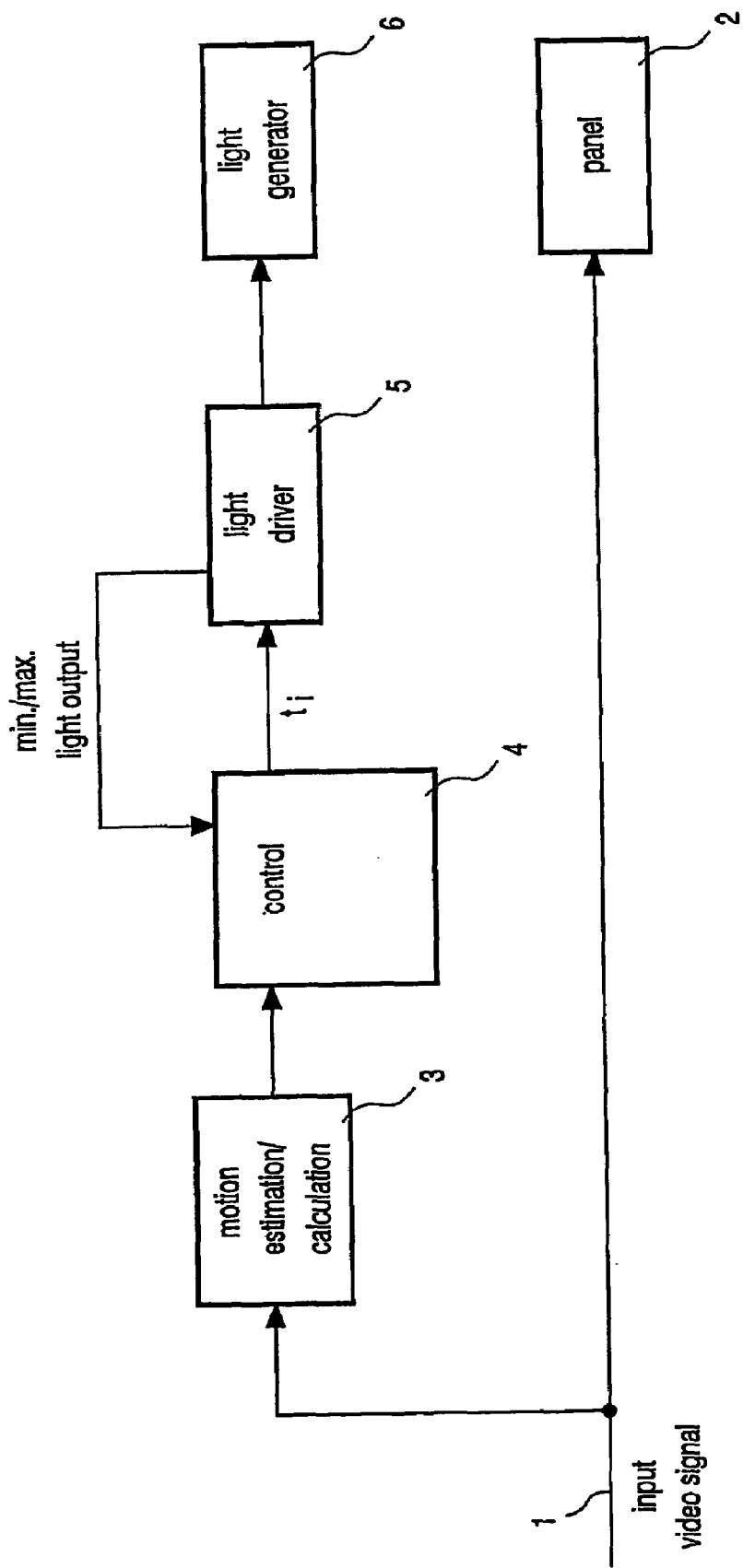
FIG. 1 shows a first embodiment of a display system with reduced motion blur, flicker and loss of brightness.

FIG. 1 depicts a block diagram according to a first embodiment of the invention with motion-dependent control of the display time. Motion and characteristics of motion of the images of an input video signal 1, which drives the row and column pixels of a non-emissive liquid crystal display panel 2, are extracted in a motion estimation/calculation unit 3 and then fed into a control unit 4 that adjusts the display time $t_i$ depending on the measured or estimated motion and the characteristics of motion. The adjusted display time then is applied to the light drivers 5 that drive the front- or back-lights 6 of the display in a flashing manner, i.e., all lights are jointly switched, or scanning manner, i.e., switching of the lights is performed sequentially for single pixels or groups of pixels such as, e.g., segmented rows or columns of pixels, so that a region of the display panel is illuminated in the moment when the proper transmission value of all pixels in this region is reached. The light drivers 5 preferably adjust the instantaneous light output according to the input display time, e.g., in a fashion that a constant overall light output is achieved by adjusting the instantaneous light output inversely proportional to the display time. Information that the maximum or minimum instantaneous light output capability is reached is fed back from the drivers 5 to the display time control unit 4 to provide further information on proper adjustment of the display time.

Figure 2:
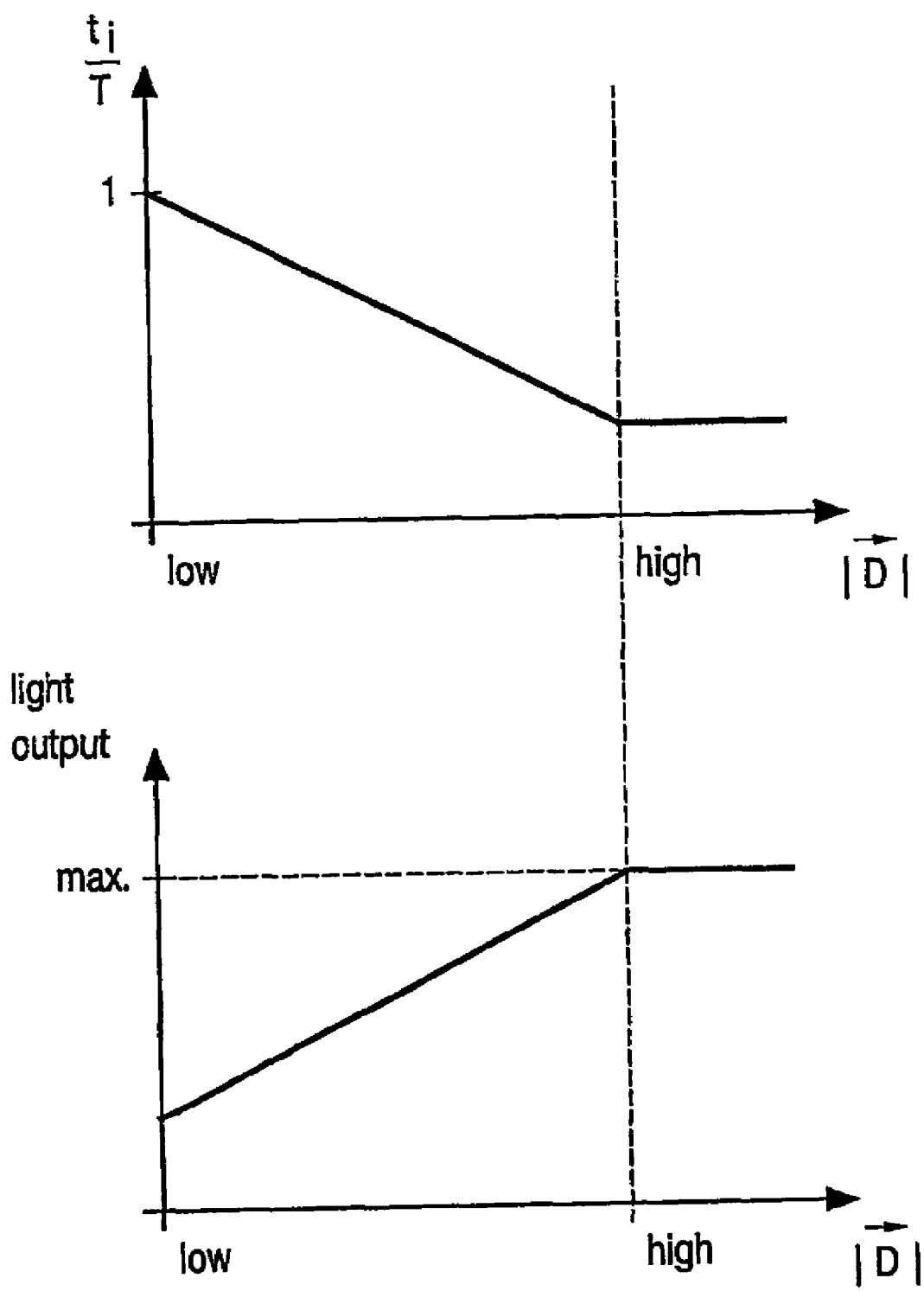
FIG. 2 shows an illustration of the relationship between display time and instantaneous light output for this embodiment.

FIG. 2 illustrates a possible relation between the display duty cycle $$\frac{t_i}{T}$$

(upper diagram) and the instantaneous light output (lower diagram) of the front- or back-lights depending on the measured amount of motion $|\vec{D}|$. For a low amount of motion, no motion blur occurs and a large duty cycle $$\frac{t_i}{T} = 1$$

can be used to maintain the brightness and reduce flicker. The instantaneous light output can be low at this stage, but does not necessarily take its minimum value. With increasing amount of motion, motion blur increases, and the duty cycle is decreased while increasing the instantaneous light output of the lights. The duty cycle can be further decreased until it reaches its practical limits, which can, for instance, be determined by the maximum light output capability of the lights.

Note that, in contrast to the exemplary curves as depicted in FIG. 2, also non-linear curves are possible to describe the reduction of the duty cycle and the increase of the instantaneous light output of the front- or back-lights.

Figure 3:
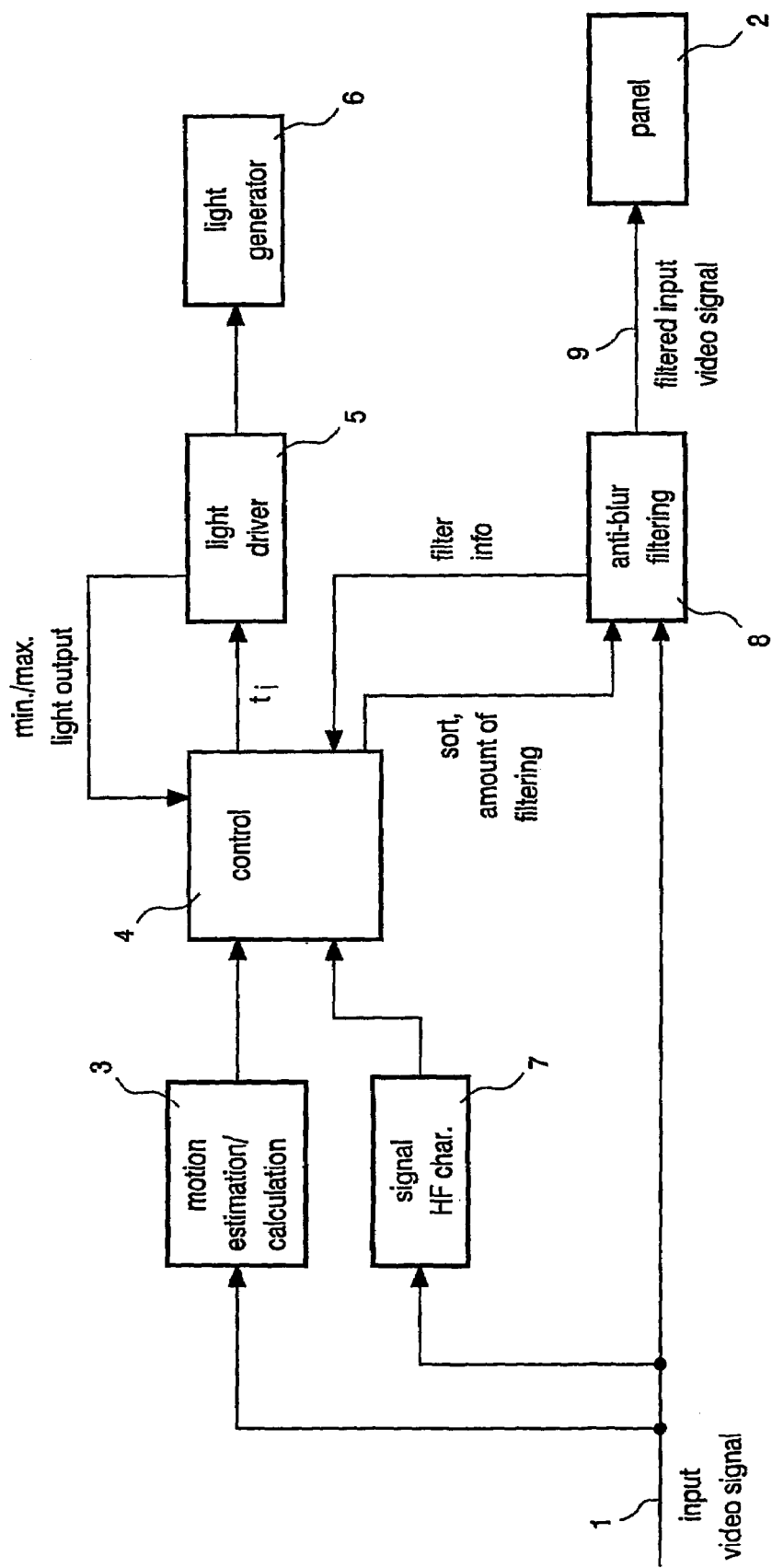
FIG. 3 shows a second embodiment of a display system with reduced motion blur, flicker and loss of brightness.

FIG. 3 shows a block diagram according to the second preferred embodiment of the invention with motion-dependent joint control of display time and sort and amount of anti-motion blur filtering for a non-stroboscopic non-emissive display.

Motion and motion characteristics of the images of an input video signal 1 are extracted in a motion estimation/calculation unit 3. Quite as well, image characteristics determining high spatial frequency properties of the input video signal are extracted in a signal HF characteristics unit 7.

The determined amount and characteristics of motion as well as the high spatial frequency properties of the input video signal are applied to a control unit 4 that jointly controls the display time and the sort and amount of anti-motion blur filtering.

Information on the sort and amount of anti-motion blur filtering, for example, calculated filter coefficients, are then applied to an anti-motion blur filter 8 that filters the input video signal 1 and thus produces the filtered input video signal 9. This filtered input video signal 9 then drives the row and column pixels of the display panel 2. The anti-motion blur filter 8 can be implemented as high spatial frequency boosting filter that pre-compensates for the low-pass filtering operation that is performed by the viewer when tracking motion in the displayed video and can, for instance, take the shape of a finite or infinite impulse response filter. Information on signal clipping in the filtered input video signal due to an exceeding of the dynamic range of the display panel can be fed back to the control unit 4.

The display time as calculated by the control unit 4 is applied to the light drivers 5, which adjust the instantaneous light output of the front- or back-lights 6 accordingly and feed back information that the maximum or minimum light output capability has been reached to the control unit 4.

Figure 4:
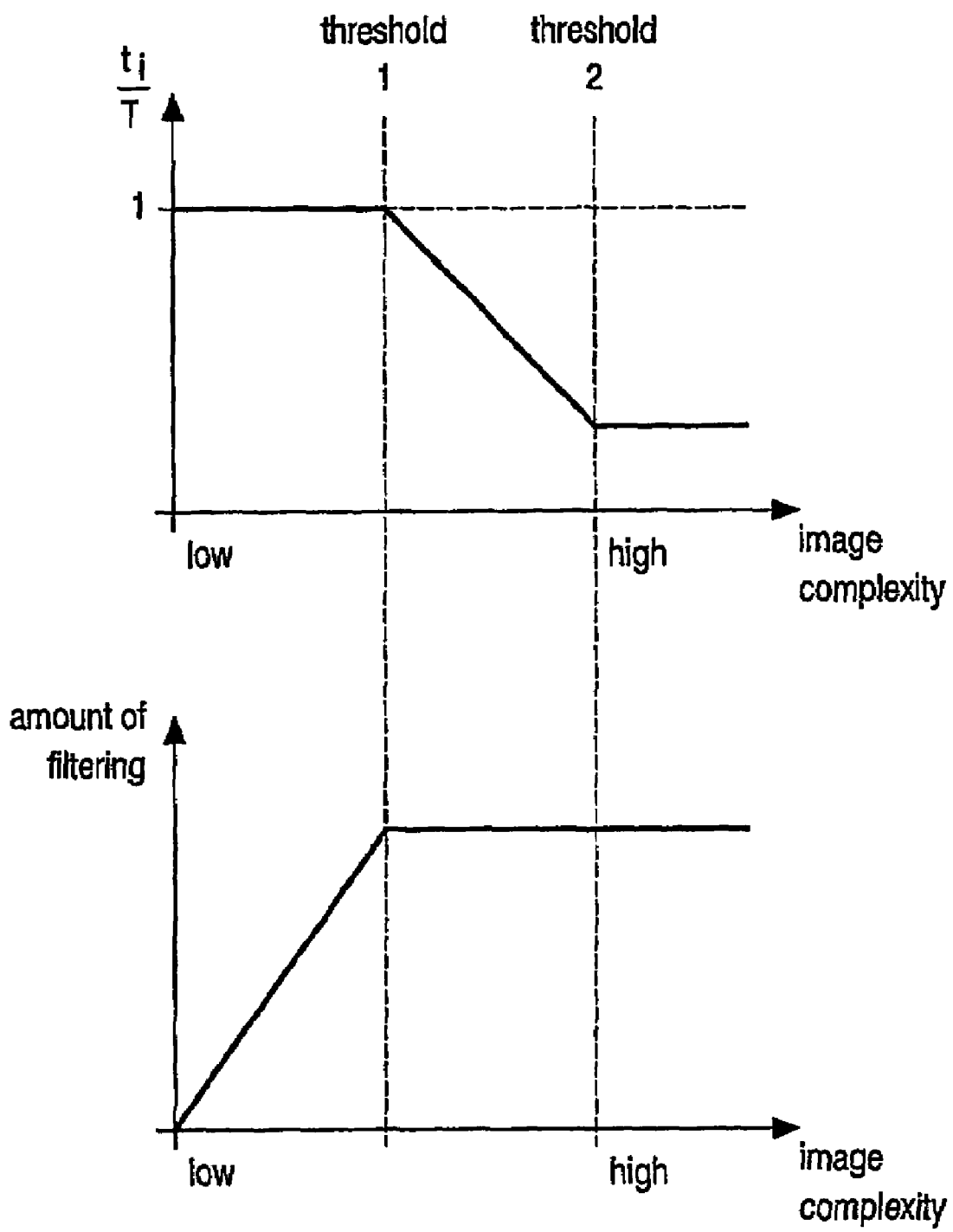
FIG. 4 shows an illustration of the relationship between display time and sort and amount of anti-motion blur filtering.

FIG. 4 illustrates a possible relation between the duty cycle (upper diagram) and the amount of anti-motion blur filtering (lower diagram) depending on an image complexity measure. This image complexity measure comprises the amount and characteristics of motion, the complexity of motion that refers to the case when there exist different areas in the image with diverse motion, the amount of noise, the level of clipping of the filtered input video signal that is, namely, critical in case of high contrast, high frequency detailed image and/or high motion, and the amount of artefacts introduced by anti-motion blur filtering.

From equation 5, it is obvious that in case of little motion, or actually a small product $$\frac{t_i}{T}\vec{D},$$

the resulting motion blur is not severe. Anti-motion blur filtering then can be performed without introducing too much artefacts. In case the motion increases, or in case of complex motion, there comes a certain point where anti-motion blur filtering introduces visible artefacts. Until this point, which is marked by threshold 1 in FIG. 4, it is preferred to keep the duty cycle $$\frac{t_i}{T}$$

as large as possible to maintain image brightness and to eliminate flicker. When the image complexity exceeds this threshold 1, anti-motion blur filtering along can no longer cope with image blur, because the introduced visible artefacts would become worse. From then on, a combined reduction of image blur by anti-motion blur filtering and reduction of the duty cycle is performed. This can be done by reducing the duty cycle $$\frac{t_i}{T}$$

in equation 5 proportional to the increasing motion $\vec{D}$. When anti-motion blur filtering is performed by high spatial frequency boosting, the amount of filtering depends on the cut-off-frequency of the spatial frequency low-pass filter that causes motion blur and is inversely proportional to the product $$\frac{t_i}{T}\vec{D}.$$

By reducing the duty cycle proportional to the increasing motion, the amount of anti-motion blur filtering (e.g., the cut-off-frequency where boosting starts) and thus the amount of introduced visible artefacts remain unchanged.

With further increasing image complexity, the duty cycle can be further decreased, until it reaches its practical limits at threshold 2 in FIG. 4. This threshold 2 may be marked by the maximum instantaneous light output capability of the lights, as indicated by the constant duty cycle in the upper diagram of FIG. 4. Further decreasing the duty cycle beyond threshold 2 would lead to a drop of brightness, which may be acceptable when priority is given to elimination of image blur. As indicated by the lower diagram of FIG. 4, even if the duty cycle has reached its minimum, the amount of anti-motion blur filtering beyond threshold 2 remains the same, i.e., when calculating the anti-motion blur filter coefficients, a further reduction of the duty cycle $$\frac{t_i}{T}$$

is assumed so that the product $$\frac{t_i}{T}\vec{D}$$

remains constant.

Note that the curves for the duty cycle and the amount of anti-motion blur filtering as depicted in FIG. 4 are to be understood as one possible example for the joint control of duty cycle and anti-motion blur filtering. A linear shape of the curves and the exact segmentation of the image complexity axis into three sections, as marked by the thresholds, is not mandatory. For instance, a non-linear curve starting at duty cycle 1 and ending in the minimum duty cycle as in FIG. 4, but starting to fall below duty cycle 1 before threshold 1 is reached, having an inflection point between threshold 1 and threshold 2 and showing a further reduction of the duty cycle beyond threshold 2 may be imagined. Quite similarly, the curve for the amount of anti-motion blur filtering may start a zero and smoothly approach the value for the maximum amount of filtering without being affected by threshold 1 and 2.

The invention claimed is:

1. A method for reducing motion blur, flicker and loss of brightness of images shown in non-stroboscopic display devices, in which each image of an input video signal is displayed during a display time $t_i$, which is less than or equal to a picture period T, comprising the steps of:
   measuring motion and the characteristics of motion in the images of the input video signal; and
   adjusting display time $t_i$ continuously between 0 and T according to the measured motion and the characteristics of motion,
   wherein the input video signal is filtered to pre-compensate for the viewer's integration of pixel intensities along the motion trajectory of moving objects in the input video signal, which can be interpreted as a motion-dependent low-pass filtering in the spatial frequency domain, and that the sort and amount of this anti-motion blur filtering is jointly controlled with the display time $t_i$ according to the measured motion and the characteristics of motion,
   and wherein, with increasing measured amount of motion, the amount of anti-motion blur filtering is steadily increased until a maximum amount of anti-motion blur filtering is reached and that with said increasing measured amount of motion, the display time $t_i$ is first kept constant and then steadily reduced below the picture period T until a minimum display time is reached.

2. A method for reducing motion blur, flicker and loss of brightness of images shown in non-stroboscopic display devices, in which each image of an input video signal is displayed during a display time $t_i$, which is less than or equal to a picture period T, comprising the steps of:
   measuring motion and the characteristics of motion in the images of the input video signal; and
   adjusting display time $t_i$ continuously between 0 and T according to the measured motion and the characteristics of motion,
   wherein the input video signal is filtered to pre-compensate for the viewer's integration of pixel intensities along the motion trajectory of moving objects in the input video signal, which can be interpreted as a motion dependent low-pass filtering in the spatial frequency domain, and that the sort and amount of this anti-motion blur filtering is jointly controlled with the display time $t_i$ according to the measured motion and the characteristics of motion,
   and wherein the amount of anti-motion blur filtering is increased proportional to the increasing measured amount of motion without reducing the display time $t_i$ below the picture period T as long as the measured amount of motion is below a first threshold, that the amount of anti-motion blur filtering is kept constant and the display time is reduce proportional to the measured amount of motion as long as the measured amount of motion is above the first threshold and below a second threshold, and that the display time is not further decreased and the amount of anti-motion blur filtering is kept constant if the measured amount of motion is above the second threshold.

3. The method according to claim 2, wherein the first threshold is defined by the amount of motion that leads to visible artefacts when anti-motion blur filtering is performed.

4. The method according to claim 2 wherein the second threshold is derived from the maximum instantaneous light output capability of the front- or back-lights or the emissive pixels.

5. A non-stroboscopic display device having means for displaying each image of an input video signal during a display time $t_i$, which is less than or equal to a picture period T, said non-stroboscopic display device comprising:
   means for measuring motion and characteristics of motion in the images of the input video signal; and means for continuously adjusting the display time $t_i$ between 0 and T according to the measured motion and the measured characteristics of motion, wherein said non-stroboscopic display device further comprises:

means for anti-motion blur filtering the input video signal to pre-compensate for the viewer's integration of pixel intensities along the motion trajectory of moving objects in the input video signal, which can be interpreted as a motion-dependent low-pass filtering in the spatial frequency domain; and means for jointly controlling the sort and amount of the anti-motion blur filtering with the display time $t_i$ according to the measured motion and the characteristics of motion, wherein, with increasing measured amount of motion, jointly controlling means steadily increases the amount of anti-motion blur filtering until a maximum amount of anti-motion blur filtering is reached, and wherein, with said increasing measured amount of motion, said jointly controlling means keeps the display time $t_i$ constant and then steadily reduces the display time below the picture period T until a minimum display time is reached.

6. The non-stroboscopic display device as claimed in claim 5, wherein said jointly controlling means increases the amount of anti-motion blur filtering proportional to the increasing measured amount of motion without reducing the display time $t_i$ below the picture period T as long as the measured amount of motion is below a first threshold, wherein said jointly controlling means keeps the amount of anti-motion blur filtering constant, and reduces the display time $t_i$ proportional to the measured amount of motion as long as the measured amount of motion is above the first threshold and below a second threshold, and wherein said jointly controlling means does not further decrease the display time $t_i$ and keeps the amount of anti-motion blur filtering constant if the measured amount of motion is above the second threshold.

7. A method for reducing motion blur, flicker and loss of brightness of images shown in non-stroboscopic display devices, in which each image of an input video signal is displayed during a display time $t_i$, which is less than or equal to a picture period T, comprising the steps of:

measuring motion and the characteristics of motion in the images of the input video signal, filtering the input video signal, wherein the sort and amount of filtering is jointly controlled with the display time $t_i$; and adjusting display time $t_i$ continuously between 0 and T according to the measured motion and the characteristics of motion, wherein with the increasing measured amount of motion, the amount of filtering is steadily increased until a maximum amount of filtering is reached and that with said increasing measured amount of motion, the display time $t_i$ is first kept constant and then steadily reduced below the picture period T until a maximum display time is reached.

8. A method for reducing motion blur, flicker and loss of brightness of images shown in non-stroboscopic display devices, in which each image of an input video signal is displayed during a display time $t_i$, which is less than or equal to a picture period T, comprising the steps of:

measuring motion and the characteristics of motion in the images of the input video signal, filtering the input video signal, wherein the sort and amount of filtering is jointly controlled with the display time $t_i$; and adjusting display time $t_i$ continuously between 0 and T according to the measured motion and the characteristics of motion, wherein the amount of filtering is increased proportional to the increasing measured amount of motion without reducing the display time $t_i$ below the picture period T as long as the measured amount of motion is below a first threshold, that the amount of filtering is kept constant and the display time is reduced proportional to the measured amount of motion as long as the measured amount of motion is above the first threshold and below a second threshold, and that the display time is not further decreased and the amount of filtering is kept constant if the measured amount of motion is above the second threshold.

9. The method according to claim 8, wherein the first threshold is defined by the amount of motion that leads to visible artefacts when filtering is performed.

10. The method according to claim 8 wherein the second threshold is derived from the maximum instantaneous light output capability of the front- or back-lights or the emissive pixels.

* * * * *